(12) United States Patent
Bradbury et al.

(10) Patent No.: US 9,760,511 B2
(45) Date of Patent: Sep. 12, 2017

(54) EFFICIENT INTERRUPTION ROUTING FOR A MULTITHREADED PROCESSOR

(71) Applicant: International Business Machines Corporation, Armonk, NY (US)

(72) Inventors: Jonathan D. Bradbury, Poughkeepsie, NY (US); Fadi Y. Busaba, Poughkeepsie, NY (US); Mark S. Farrell, Pleasant Valley, NY (US); Charles W. Gainey, Jr., Poughkeepsie, NY (US); Dan F. Greiner, San Jose, CA (US); Lisa C. Heller, Rhineback, NY (US); Christian Jacobi, Poughkeepsie, NY (US); Jeffrey P. Kubala, Poughquag, NY (US); Frank Lehnert, Weil im Schoenbuch (DE); Bernd Nerz, Boeblingen (DE); Damian L. Osisek, Vestal, NY (US); Donald W. Schmidt, Stone Ridge, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 44 days.

(21) Appl. No.: 14/509,533

(22) Filed: Oct. 8, 2014

(65) Prior Publication Data
US 2016/0103774 A1    Apr. 14, 2016

(51) Int. Cl.
*G06F 12/00* (2006.01)
*G06F 13/24* (2006.01)
(Continued)

(52) U.S. Cl.
CPC .......... *G06F 13/26* (2013.01); *G06F 9/45558* (2013.01); *G06F 9/46* (2013.01); *G06F 2009/45579* (2013.01)

(58) Field of Classification Search
CPC .... G06F 9/4818; G06F 9/4843; G06F 9/4812; G06F 11/3419; G06F 9/4887; G06F 1/3203; G06F 9/30087
(Continued)

(56) References Cited

U.S. PATENT DOCUMENTS 4,779,188 A * 10/1988 Gum ...................... G06F 9/4843
711/E12.061
4,887,202 A * 12/1989 Tanaka ................... G06F 13/10
703/21

(Continued)

FOREIGN PATENT DOCUMENTS

WO     2010033569 A1     3/2010

OTHER PUBLICATIONS

Gordon, Abel et al. "ELI: Bare-Metal Performance for I/O Virualization." Proceedings of the Seventeenth International Conference on Architectural Support for Programming Languages and Operating Systems, ASPLOS XVII, ASPLOS '12, Mar. 3-7, 2012, London, England, UK, pp. 411-422.*
(Continued)

*Primary Examiner* — Farley Abad
*Assistant Examiner* — Henry Yu
(74) *Attorney, Agent, or Firm* — Cantor Colburn LLP; William A. Kinnaman, Jr.

(57) ABSTRACT

A system and method of implementing a modified priority routing of an input/output (I/O) interruption. The system and method determines whether the I/O interruption is pending for a core and whether any of a plurality of guest threads of the core is enabled for guest thread processing of the interruption in accordance with the determining that the I/O interruption is pending. Further, the system and method determines whether at least one of the plurality of guest threads enabled for guest thread processing is in a wait state
(Continued)

and, in accordance with the determining that the at least one of the plurality of guest threads enabled for guest thread processing is in the wait state, routes the I/O interruption to a guest thread enabled for guest thread processing and in the wait state.

14 Claims, 6 Drawing Sheets

(51) Int. Cl.
*G06F 13/00* (2006.01)
*G06F 9/26* (2006.01)
*G06F 13/26* (2006.01)
*G06F 9/455* (2006.01)
*G06F 9/46* (2006.01)

(58) Field of Classification Search
USPC .............. 710/200, 262; 718/103, 104, 107; 711/E12.061; 713/322
See application file for complete search history.

(56) References Cited

U.S. PATENT DOCUMENTS

| | | | | |
|---|---|---|---|---|
| 5,222,215 A * | 6/1993 | Chou | .................... | G06F 9/4812 710/262 |
| 5,701,501 A * | 12/1997 | Gandhi | ................ | G06F 9/3004 710/262 |
| 5,894,583 A * | 4/1999 | Johnson | ................ | G06F 9/4825 710/260 |
| 8,656,145 B2 | 2/2014 | Plondke et al. | | |
| 2002/0099760 A1* | 7/2002 | Liang | .................. | G06F 11/3419 718/107 |
| 2002/0198925 A1* | 12/2002 | Smith | .................... | G06F 9/4887 718/104 |
| 2004/0267996 A1* | 12/2004 | Hammarlund | ........ | G06F 1/3203 710/200 |
| 2006/0026385 A1* | 2/2006 | Dinechin | ............ | G06F 12/1036 711/210 |
| 2006/0150010 A1* | 7/2006 | Stiffler | ................ | G06F 11/1438 714/13 |
| 2008/0168202 A1 | 7/2008 | Balazich et al. | | |
| 2010/0077399 A1* | 3/2010 | Plondke | ................ | G06F 9/4818 718/103 |
| 2010/0115249 A1* | 5/2010 | Paltashev | ............ | G06F 9/30087 712/228 |
| 2011/0173399 A1* | 7/2011 | Chen | .................... | G06F 11/348 711/154 |
| 2014/0052882 A1 | 2/2014 | Waters et al. | | |
| 2015/0067368 A1* | 3/2015 | Henry | .................. | G06F 1/3237 713/322 |

OTHER PUBLICATIONS

Abel Gordan, et al.: "Bare-Metal Performance for I/O Virtualization"; Proceedings of the Seventeenth International Conference on Architectural Support for Programming Languages and Operating Systems; XP055226063; London, England; Mar. 3, 2012; pp. 1.
International Search Report and Written Opinion No. PCT/EP2015/070982 dated Nov. 25, 2015; pp. 13.

* cited by examiner

“EFFICIENT INTERRUPTION ROUTING FOR A MULTITHREADED PROCESSOR

BACKGROUND

The disclosure relates generally to efficient interruption routing for a multithreaded processor, and more specifically, to a modified priority routing of input/output (I/O) interruption that facilitates a host or an enabled core to handle threads in waiting.

In general, processor speed has increased over the past decades, while there has not been a proportional increase in memory access speed. In turn, the faster a processor cycle time in a computing system, the more pronounced a delay is when waiting for data from memory. The effects of such delays may be mitigated by multithreading within a processor of the computing system, which allows various cores of the processor to be shared by a plurality of instruction streams known as threads. For example, during latency in a first thread being processed by a core, a second thread can utilize resources of that core.

Yet, to take advantage of the latency, the core must receive an I/O interruption. Current management practices of I/O interruptions require that an enabled host (e.g. a hypervisor) receive the interruption for processing at a higher priority than any enabled guest of the core. Thus, the host itself must then perform the initial processing of a guest's interruption, and then dispatch an enabled thread, possibly the same thread that had been operating on the core, to complete the I/O interruption processing. Unfortunately, these current management practices of I/O interruptions by a host while the one of the current guest threads are enabled for the same I/O interruption cause processing latency.

SUMMARY

According to one embodiment of the present invention, a method of implementing a modified priority routing of an input/output (I/O) interruption comprises determining, by a processor, whether the I/O interruption is pending for a core; determining, by the processor, whether any of a plurality of guest threads of the core is enabled for guest thread processing of the interruption in accordance with the determining that the I/O interruption is pending; determining, by the processor, whether at least one of the plurality of guest threads enabled for guest thread processing is in a wait state; and in accordance with the determining that the at least one of the plurality of guest threads enabled for guest thread processing is in the wait state, routing, by the processor, the I/O interruption to a guest thread enabled for guest thread processing and in the wait state.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As indicated above, management of I/O interruptions by a host of a multithreaded processor causes processing latency. Thus, what is needed is a modified priority routing of input/output (I/O) interruptions that facilitate a host or an enabled core to favor threads currently in the wait state.

In general, embodiments of the present invention disclosed herein may include a multithreading system, method, and/or computer program product that utilizes at least one core of a plurality of cores to process multiple threads. Further, at any given time, an interruption signal that is initiated outside of the plurality of cores may be broadcast to the plurality of cores. Upon broadcasting of the interruption signal, a serialization occurs between enabled cores of the plurality of cores that provides the interruption signal to only one of the enabled cores. That is, I/O interruptions are floating interruptions (e.g., once an I/O interruption is made pending in the system, it is made pending on all physical cores in the system). Each thread on those cores may then be enabled or disabled for those interruptions. For example, enablement or disablement may be based on a guest program-status word bit 6 (PSW.6), a guest control register 6 (CR6), a host PSW.6, and a zone mask table (ZMT), as further described below). The hardware on each core that is enabled in the system independently invokes the I/O interruption firmware routine—indicating to firmware if that interruption is a guest or host interruption. Once invoked, this firmware routine attempts to "dequeue" the interruption. In response to the dequeue, the system hardware indicates to one core (e.g., the first core to request the dequeue) that it had successfully dequeued the interruption, and removes that I/O interruption from the queue so it is no longer pending in the system; if any other core in the system attempts to dequeue the same I/O interruption, it is notified that the dequeue was unsuccessful. Firmware on the core that had successfully dequeued the interruption presents that I/O interruption to either a hypervisor (e.g., host) or to the guest software based on priority as determined by the hardware. If the interruption is to be presented to the host while the guest is active, then there is processing required by the firmware to save the guest state and reinstate the host state in the hardware. Once the hypervisor has received the interruption, it then also has additional work to do in order to reinstate the guest state and present that I/O interruption to the appropriate guest.

In operation, for example, when an I/O interruption is presented from a channel subsystem to the system, a bit corresponding to a zone and an interrupt subclass (ISC) of the interrupting device (e.g., associated with the interruption) is set in the pending interruption array (PIA) of each core. An ISM is a mask of bits, one per ISC, e.g. the ISM in CR6 for controlling enablement. A PIA entry, indexed by zone number, could likewise be thought of as an ISM. In an embodiment, there are 8 ISCs and, therefore, the PIA contains 8 bits for each supported logical partition (LPAR) or zone. The only PIA entry that pertains to the guest thread is that entry that represents pending I/O interruptions for the zone that is currently running on the core hardware. If an I/O interruption is pending for the current zone and for a particular ISC, it is enabled in the guest if 1) the I/O enablement in the guest PSW.6 is on and 2) the bit corresponding to the ISC is on in the 8-bit interrupt subclass mask (ISM) bit in guest CR6. From a host perspective while running a guest, pending I/O interruptions, as indicated in the PIA, can apply for any zone, including the current zone. If an I/O interruption is pending for a particular ISC within a particular zone, it is enabled in the host if 1) host PSW bit 6 is on and 2) the enablement for the specific zone and ISC is on in the corresponding ZMT. In the ZMT there are 8 enablement bits per supported zone, corresponding directly to the bits in the PIA. Any I/O interruption which is pending for the current zone can be enabled in both the guest and the host at the same time.

If an interruption which is pending in the PIA is enabled in one or more guest threads or in the host or in both, an I/O interruption priority process is invoked on the core hardware. In previous implementations, if both the guest and host were enabled for a particular I/O interruption on any given thread, that I/O interruption would be presented to the host (e.g., as the host had the higher priority). In embodiments described herein, for this same case, the I/O interruption may instead be presented to the guest. In addition, priority hardware has been added to present any particular I/O interruption to only one physical thread on the core with priority given amongst enabled guest threads based on guest wait state as indicated in guest PSW bit 14. This priority scheme provides priority between threads within a core. In addition, if an I/O interruption is pending and is enabled in the host on this core and either no guest thread on this core is enabled for that interruption or this interruption does not apply to the threads running on this core, a delay is added before presenting that host interruption (e.g., accepting the interruption on this core). This allows an enabled guest thread on another core, if one exists, to take the I/O interruption first, indirectly providing priority between cores in the system.

Figure 1:
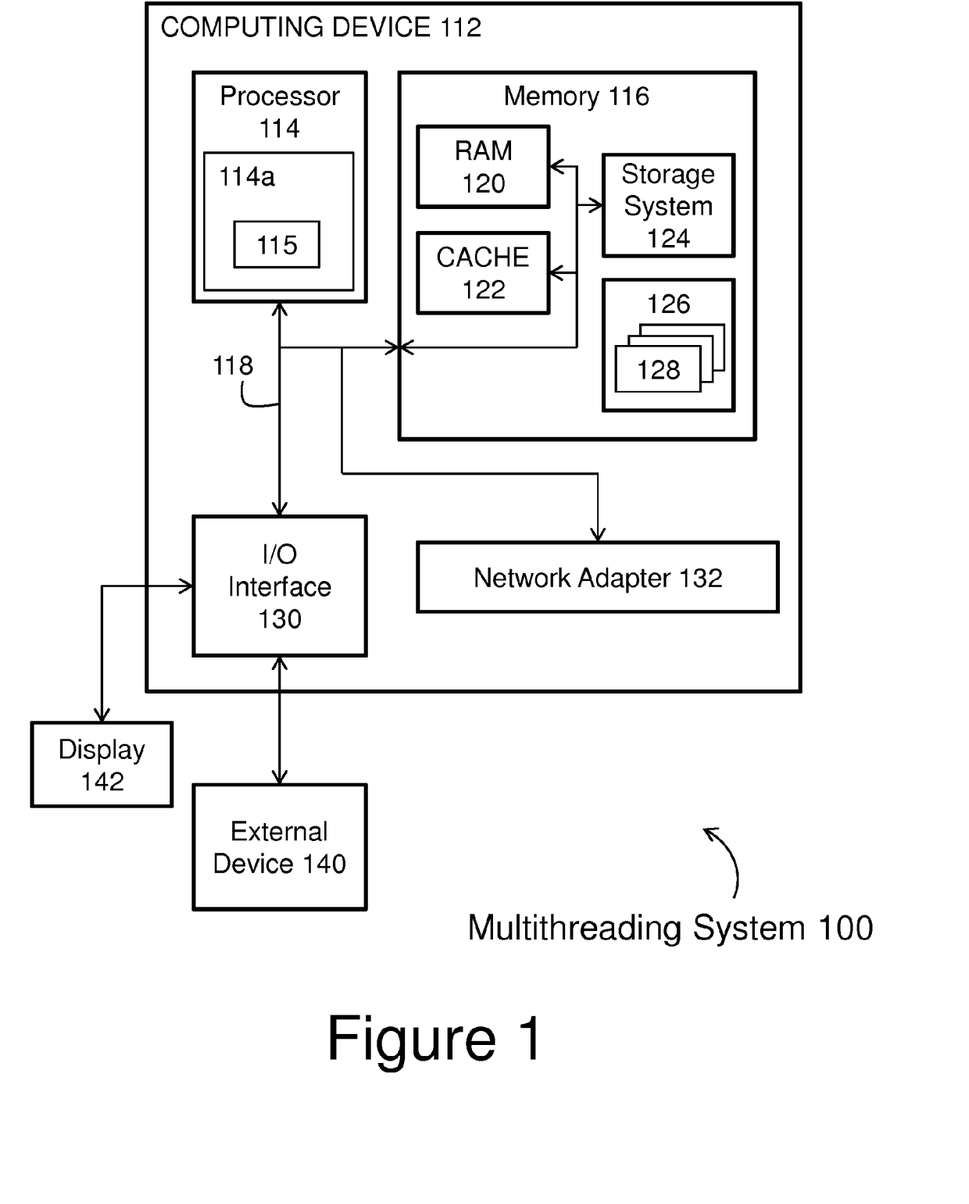
FIG. 1 illustrates a computing device schematic of a multithreading system.

Referring now to FIG. 1, an example of a multithreading system 100 including a computing device 112 is shown. The multithreading system 100 is only one example of a suitable computing node and is not intended to suggest any limitation as to the scope of use or operability of embodiments of the invention described herein (indeed additional or alternative components and/or implementations may be used). That is, the multithreading system 100 and elements therein may take many different forms and include multiple and/or alternate components and facilities. Further, the multithreading system 100 may include and/or employ any number and combination of computing devices and networks utilizing various communication technologies, as described herein. Regardless, the multithreading system 100 is capable of being implemented and/or performing any of the operability set forth herein.

In the multithreading system 100 there is a computing device 112, which is operational with numerous other general purpose or special purpose computing system environments or configurations. Systems and/or computing devices, such as the multithreading system 100 and/or the computing device 112, may employ any of a number of computer operating systems, including, but by no means limited to, versions and/or varieties of the AIX UNIX and z/OS operating systems distributed by International Business Machines Corporation of Armonk, N.Y., the Microsoft Windows operating system, the Unix operating system (e.g., the Solaris operating system distributed by Oracle Corporation of Redwood Shores, Calif.), the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing systems, environments, and/or configurations that may be suitable for use with the computing device 112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, computer workstations, servers, desktops, notebooks, network devices, mainframe computer systems, and distributed cloud computing environments that include any of the above systems or devices, and the like.

The computing device 112 may be described in the general context of computer system executable instructions, such as program modules, being executed by a computer system. Generally, program modules may include routines, programs, objects, components, logic, data structures, and so on that perform particular tasks or implement particular abstract data types. The computing device 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computing device 112 in the multithreading system 100 is shown in the form of a general-purpose computing device that is improved upon based on the operation and functionality of the multithreading system 100, its methods, and/or elements thereof. The components of the computing device 112 may include, but are not limited to, one or more processors or processing units (e.g., processor 114 that includes at least one core 114a that supports a plurality of threads 115; e.g., a multithreading system 100 includes a core 114a of a processor 114 comprising two or more threads 115), a memory 116, and a bus 118 that couples various system components including the processor 114 and the memory 116. The computing device 112 also typically includes a variety of computer system readable media. Such media may be any available media that are accessible by the computing device 112, and it includes both volatile and non-volatile media, removable and non-removable media.

The processor 114 may receive computer readable program instructions from the memory 116 and execute these instructions, thereby performing one or more processes defined by the multithreading system 100. The processor 114 may include any processing hardware, software, or combination of hardware and software utilized by the computing device 114 that carries out the computer readable program instructions by performing arithmetical, logical, and/or input/output operations. Examples of elements of the processor 114 and core 114a include, but are not limited to an arithmetic logic unit, which performs arithmetic and logical operations; a control unit, which extracts, decodes, and executes instructions from a memory; and an array unit, which utilizes multiple parallel computing elements.

Figure 2:
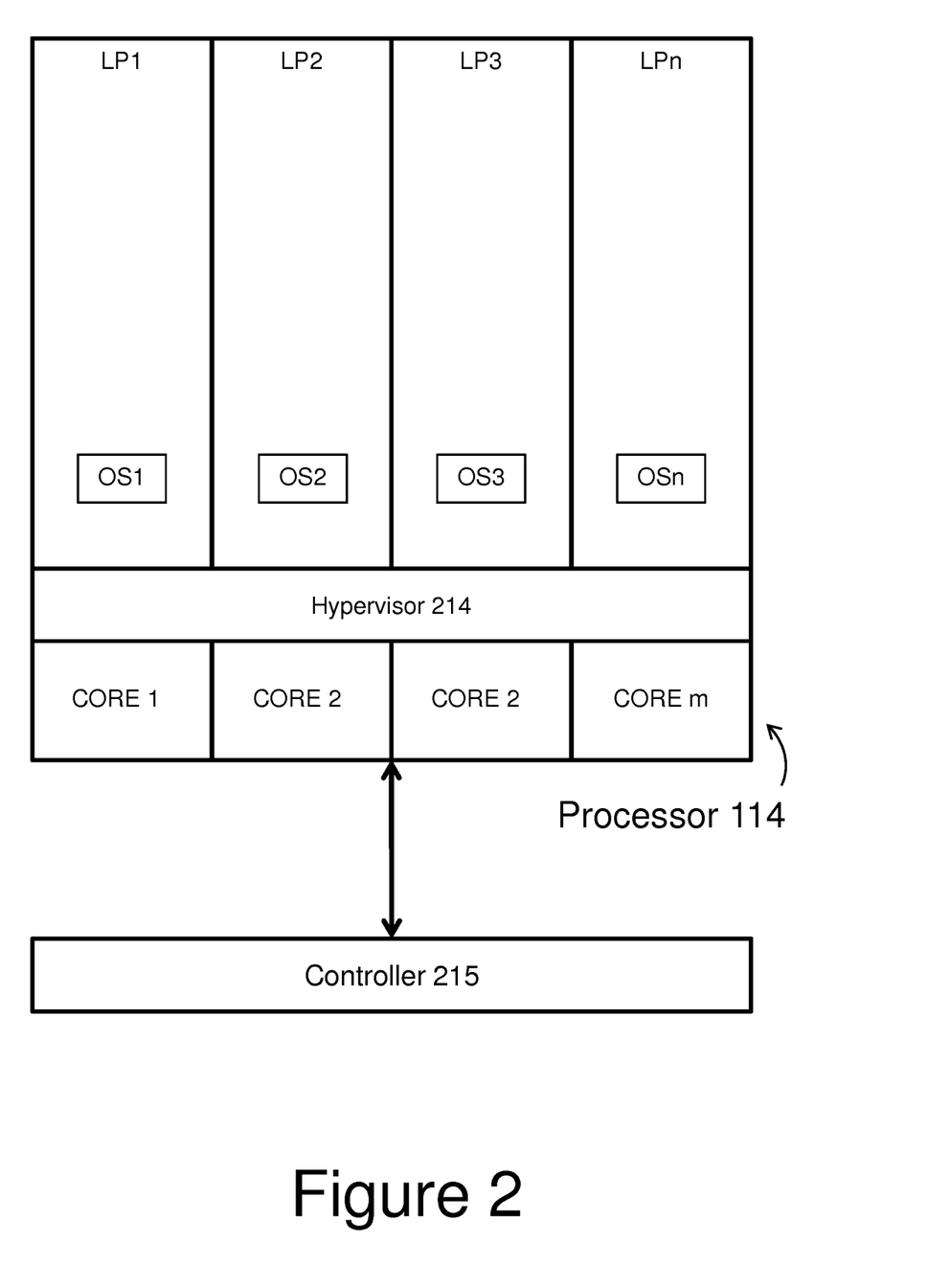
FIG. 2 illustrates a processor schematic of a multithreading system.

FIG. 2 illustrates an embodiment of a computing environment that includes the processor 114 coupled to a controller 215. In one example, a computing environment based on the z/Architecture includes a System z server, offered by International Business Machines Corporation, Armonk, N.Y. The processor 114 can include, for example, one or more partitions (e.g., logical partitions LP1-LPn), one or more physical cores (e.g., Core 1-Core m), and a level-0 hypervisor 214 (e.g., a logical partition manager). The controller 215 can include centralized logic responsible for arbitrating between different processors issuing requests. For instance, when the controller 215 receives a memory access request, it determines if access to that memory location is allowed and, if so, provides the contents of that memory location to the processor 114 while maintaining memory consistency between processors within that complex. Another controller 215 may manage the requests to and from the I/O adapters through an I/O interface 130 and from a network adapter 132 shown in FIG. 1.

Physical cores include physical processor resources that are allocated to the logical partitions. A logical partition can include one or more logical processors, each of which represents all or a share of the physical processor resources allocated to the partition. The physical cores may be either dedicated to the logical cores of a particular partition, so that physical processor resources of the underlying core(s) are reserved for that partition; or shared with the logical cores of another partition, so that physical processor resources of the underlying core(s) resources are potentially available to another partition. Each logical partition can be capable of functioning as a separate system. That is, each logical partition can be independently reset, initially loaded with an operating system (e.g., operating system OS1-OSn), if desired, and operate with different programs. An operating system or application program running in a logical partition can appear to have access to a full and complete system, but in reality, only a portion of the entire system is available. A combination of hardware and Licensed Internal Code (also referred to as firmware, microcode, or millicode) keeps a program in one logical partition from accessing or interfering with a program in a different logical partition. This allows several different logical partitions to operate on a single or multiple physical cores in a time sliced manner. In an embodiment, each physical core includes one or more central processors (also referred to herein as "physical threads"). In the example shown in FIG. 2, each logical partition has a resident operating system, which may differ for one or more logical partitions. Each logical partition is an example of a virtual machine or guest configuration, in which an operating system is capable of running.

In the embodiment shown in FIG. 2, the logical partitions LP1-LPn are managed by level-0 hypervisor 214 which is implemented by firmware running on physical cores Corel-Core m. Logical partitions LP1-LPn and hypervisor 214 each comprise one or more programs residing in respective portions of central storage (memory) associated with the physical cores Corel-Core m. One example of hypervisor 214 is the Processor Resource/Systems Manager (PR/SM™), offered by International Business Machines Corporation, Armonk, N.Y.

Referring once again to FIG. 1, the memory 116 may include a tangible device that retains and stores computer readable program instructions, as provided by the multithreading system 100, for use by the processor 114 of the computing device 112. The memory 116 can include computer system readable media in the form of volatile memory, such as random access memory 120, cache memory 122, and/or the storage system 124. The bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

By way of example only, the storage system 124 can be provided for reading from and writing to a non-removable, non-volatile magnetic medium (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 118 by one or more data media interfaces. As will be further depicted and described below, the memory 116 may include at least one program product having a set (e.g., at least one) of program modules that are configured to carry out the operations of embodiments of the invention. The storage system 124 (and/or memory 116) may include a database, data repository or other data store and may include various kinds of mechanisms for storing, accessing, and retrieving various kinds of data, including a hierarchical database, a set of files in a file system, an application database in a proprietary format, a relational database management system (RDBMS), etc. The storage system 124 may generally be included within the computing device 112, as illustrated, employing a computer operating system such as one of those mentioned above, and is accessed via a network in any one or more of a variety of manners.

Program/utility 126, having a set (at least one) of program modules 128, may be stored in memory 116 by way of example, and not limitation, as well as an operating system, one or more application programs, other program modules, and program data. Each of the operating system, one or more application programs, other program modules, and program data or some combination thereof, may include an implementation of a networking environment.

The computing device 112 may also communicate via the input/output (I/O) interface 130 and/or via the network adapter 132. The I/O interface 130 and/or the network adapter 132 may include a physical and/or virtual mechanism utilized by the computing device 112 to communicate between elements internal and/or external to the computing device 112. For example, the I/O interface 130 may communicate with one or more external devices 140, such as a keyboard, a pointing device, a display 142, etc.; one or more devices that enable a user to interact with the computing device 112; and/or any devices (e.g., network card, modem, etc.) that enable the computing device 112 to communicate with one or more other computing devices. Further, the computing device 112 can communicate with one or more networks such as a local area network (LAN), a general wide area network (WAN), and/or a public network (e.g., the Internet) via network adapter 132. Thus, I/O interface 130 and/or the network adapter 132 may be configured to receive or send signals or data within or for the computing device 112. As depicted, the I/O interfaces 130 and the network adapter 132 communicate with the other components of the computing device 112 via the bus 118. It should be understood that although not shown, other hardware and/or software components could be used in conjunction with the computing device 112. Examples, include, but are not limited to: microcode, device drivers, redundant processing units, external disk drive arrays, RAID systems, tape drives, and data archival storage systems, etc.

While single items are illustrated for the multithreading system 100 (and other items) by FIG. 1, these representations are not intended to be limiting and thus, any items may represent a plurality of items. For example, the processor 114 may include a plurality of processing cores, each of which executes a plurality of threads and is capable of receiving I/O interruption based on the modified routing priority described herein.

Figure 3:
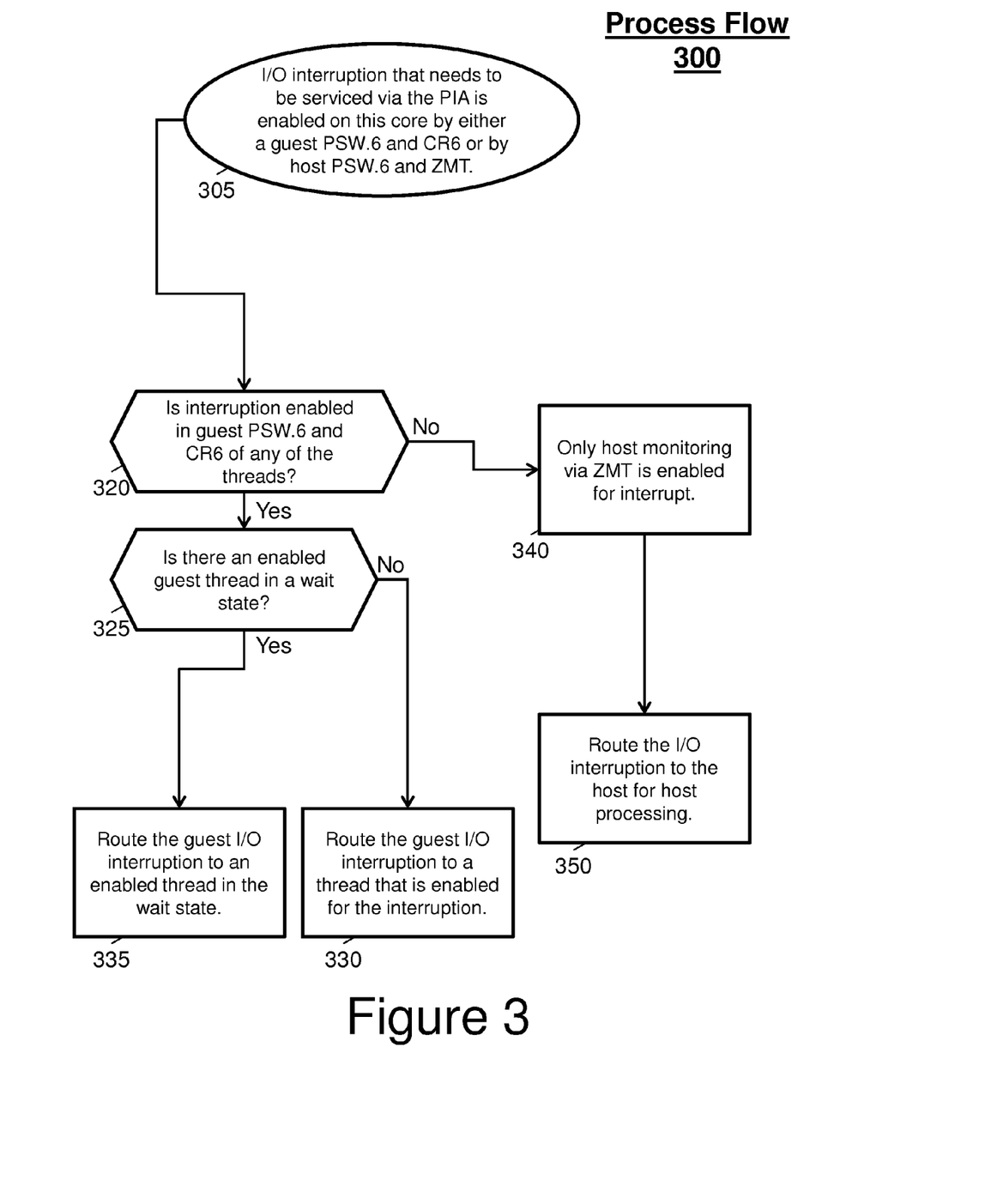
FIGS. 3-6 illustrate process flows by a multithreading system.

An embodiment of the modified priority routing by the multithreading system 100 will be described with reference to FIG. 3. FIG. 3 illustrates a process flow 300. Process flow 300 begins at start block 305 where an I/O Interruption that needs to be serviced and is pending in the PIA is enabled on a core of the plurality of cores. I/O Interruptions are enabled for a guest thread of the core via guest PSW.6 and an ISM in guest CR6. For host monitoring, I/O Interruptions of all zones including zones not currently running on the core, are enabled through the host PSW.6 and the ZMT. Any pending I/O interruption for the current zone may be enabled in both the guest and the host at the same time.

At decision block 320, the process flow 300 makes a determination as to whether the guest control and status bits are enabled for the pending I/O Interruption. For instance, the process flow 300 determines whether the pending I/O Interruption is enabled in a guest PSW.6 and CR6 of any of guest threads of the core. If any guest thread is enabled, the process flow 300 proceeds to decision block 325 (e.g., as indicated by the 'Yes' arrow) where a determination is made as to whether any of a plurality of guest threads on the core and enabled for the interruption is in a wait state. If no guest threads are in the wait state and enabled for the I/O interruption, then the process flow 300 proceeds to block 340 (e.g., as indicated by the 'No' arrow) where the pending I/O interruption is routed to a guest thread for which the pending I/O interruption is enabled. If at least one of the plurality of guest threads is in the wait state and enabled for the pending I/O interruption, then the process flow proceeds to block 335 (e.g., as indicated by the 'Yes' arrow) where the pending I/O interruption is routed to a guest thread in the wait state that is enabled for the interruption. In this way, the process flow 300 implements a modified priority routing of I/O interruption that facilitates processing by guest threads in waiting. Particularly, the I/O interruption routing priority is changed to: if there is one or more enabled thread in the wait state, the interruption is given to one of those threads; if there is no thread in the wait state that is enabled for a pending interruption, the I/O interruption is given to a thread that is enabled for it. Further, the determining of the routing for multiple threads in a wait state (335), or multiple threads not in a wait state (330), the multithreading system 100 may utilize a routing algorithm that is random or otherwise for selection.

Figure 4:
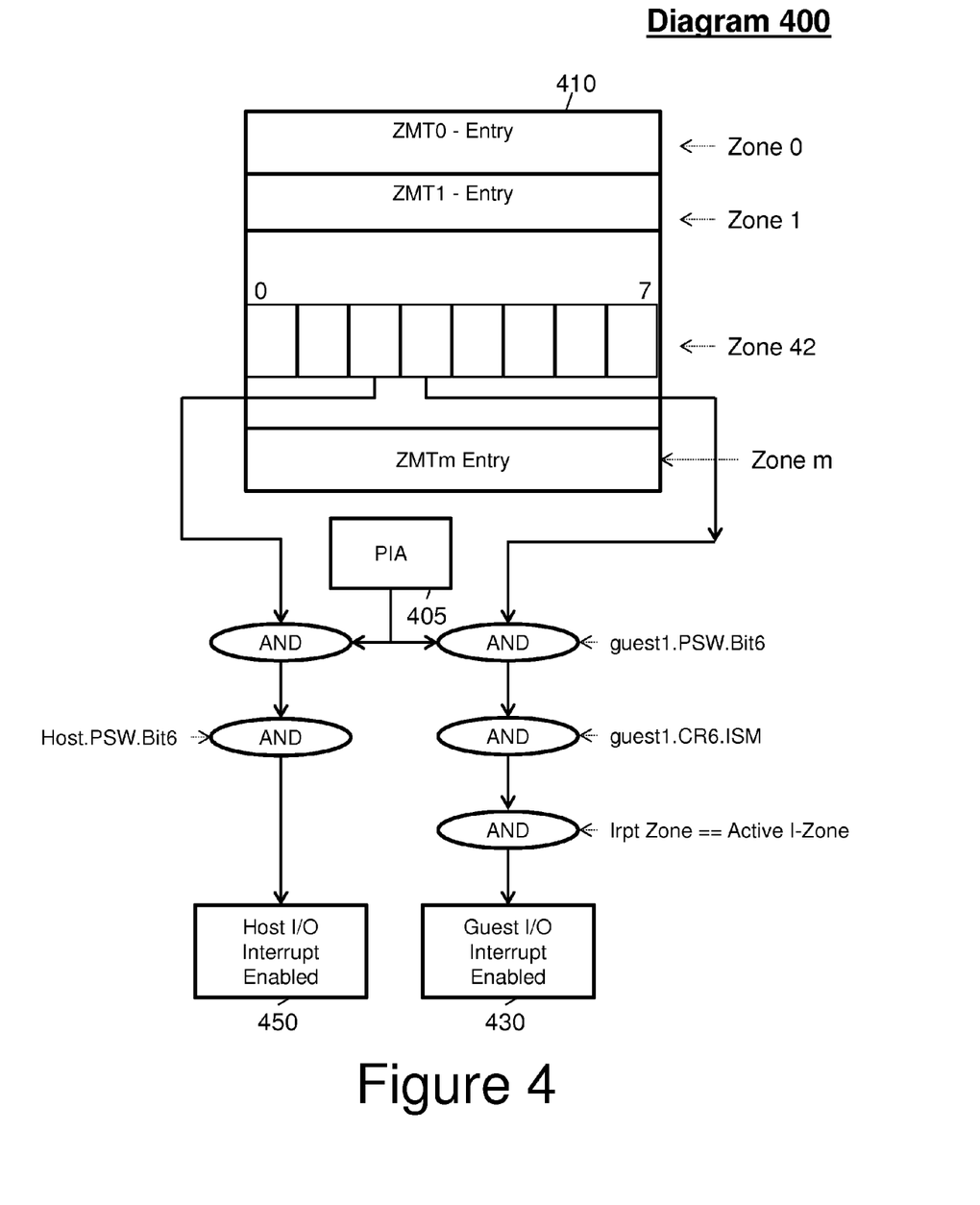

As another illustrated example, FIG. 4 shows a granular process flow 400 of routing the I/O interruption. That is, after the hardware of the multithreading system 100 discovers an I/O interruption pending in the PIA 405 is for the active zone and the guest PSW.6 and the guest CR6 are enabled, then the I/O interruption is enabled in the guest, as shown in block 430. This guest enablement applies independently for each thread on the core. When the PIA 405 has an I/O interruption pending for any zone, if host PSW.6 and the corresponding bit in the ZMT 410 are on then the interruption is enabled by host monitoring (except, the ZMT check is not applicable to zone zero), as shown in block 450. If a particular interruption is enabled in both a guest thread and in the host on this core, it will be given to the guest.

Figure 5:
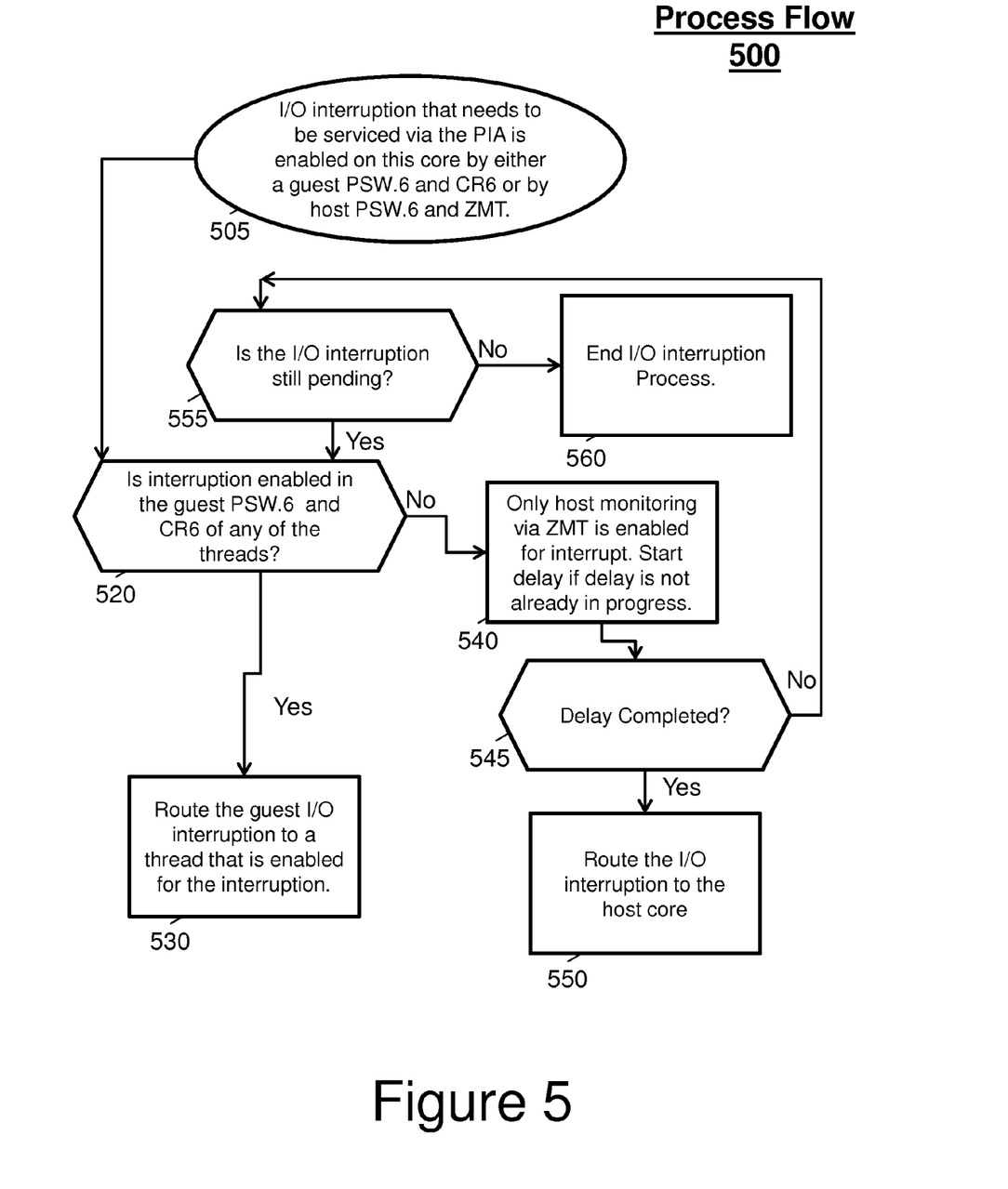

An embodiment of a delay so that the modified priority routing may be utilized by the multithreading system 100 will be described with reference to FIG. 5. FIG. 5 illustrates a process flow 500. Process flow 500 begins at start block 505 where an I/O interruption that needs to be serviced and is pending in the PIA is enabled on a core of the plurality of cores. I/O interruptions are enabled for a guest thread of the core via guest PSW.6 and an ISM in guest CR6. For host monitoring, I/O Interruptions of all zones including zones not currently running on the core, are enabled through the host PSW.6 and the ZMT (except that the ZMT check is not applicable to zone 0). Any pending I/O interruption for the current zone may be enabled in both the guest and the host at the same time.

At decision block 520, the process flow 500 makes a determination as to whether the guest control and status bits are enabled for the pending I/O Interruption. For instance, the process flow 500 determines whether the pending I/O interruption is enabled in a guest PSW.6 and CR6 of any of guest threads of the core. If any guest thread is enabled, the process flow 500 proceeds to block 530 (e.g., as indicated by the 'Yes' arrow) where the pending I/O interruption is routed to the guest thread for which the pending I/O interruption is enabled. If the process flow 500 determines the pending I/O interruption does not have its corresponding guest PSW.6 and CR6 enabled on any of the plurality of threads of the core, then the process flow 500 proceeds to block 540 (e.g., as indicated by the 'No' arrow). At block 540, the process flow 500 has identified that only host monitoring is enabled for the pending I/O interruption and starts a delay before, e.g., accepting the interruption on this core (if the delay is not already in progress). The delay may be hardcoded or programmable by the multithreading system, method, and/or computer program product. At block 545, the process flow 500 checks as to whether the delay has completed.

If the delay has not completed (e.g., as indicated by the 'No' arrow), then at decision block 555 (while delaying before accepting the interruption on this core) the process flow 500 makes a determination as to whether there is still an I/O interruption pending. If there is no I/O interruption (e.g. if another core has accepted the interruption) it will proceed to block 560 and end the hardware I/O interruption priority process (e.g., as indicated by the 'No' arrow). Further, at decision block 555, if an I/O interruption is still pending, then the process flow 500 proceeds back (e.g., as indicated by the 'Yes' arrow) to block 520 where the plurality of threads are checked for guest thread I/O interruption enablement before the delay is checked again. In turn, the delay allows one of the threads on the core, or a thread on another core, to enable and take the pending I/O interruption in the guest.

In general, as the process flow 500 loops through its iterations while delaying before presenting a host I/O interruption, the desired outcome will eventually be that no pending I/O interruptions are in the PIA because the original host interruption has been taken as a guest interruption by this or another core. If the delay has completed as determined by block 545, the process flow 500 proceeds to block 550 where the pending I/O interruption is routed to the host for host processing (e.g., as indicated by the 'Yes' arrow). Thus, only if the I/O interruption is still pending at the end of the delay will that I/O interruption be given to the host. In addition, in one embodiment, all enabled pending I/O interruptions will be taken at the end of the delay, and the delay will not start over until all enabled I/O interruptions have been processed.

Figure 6:
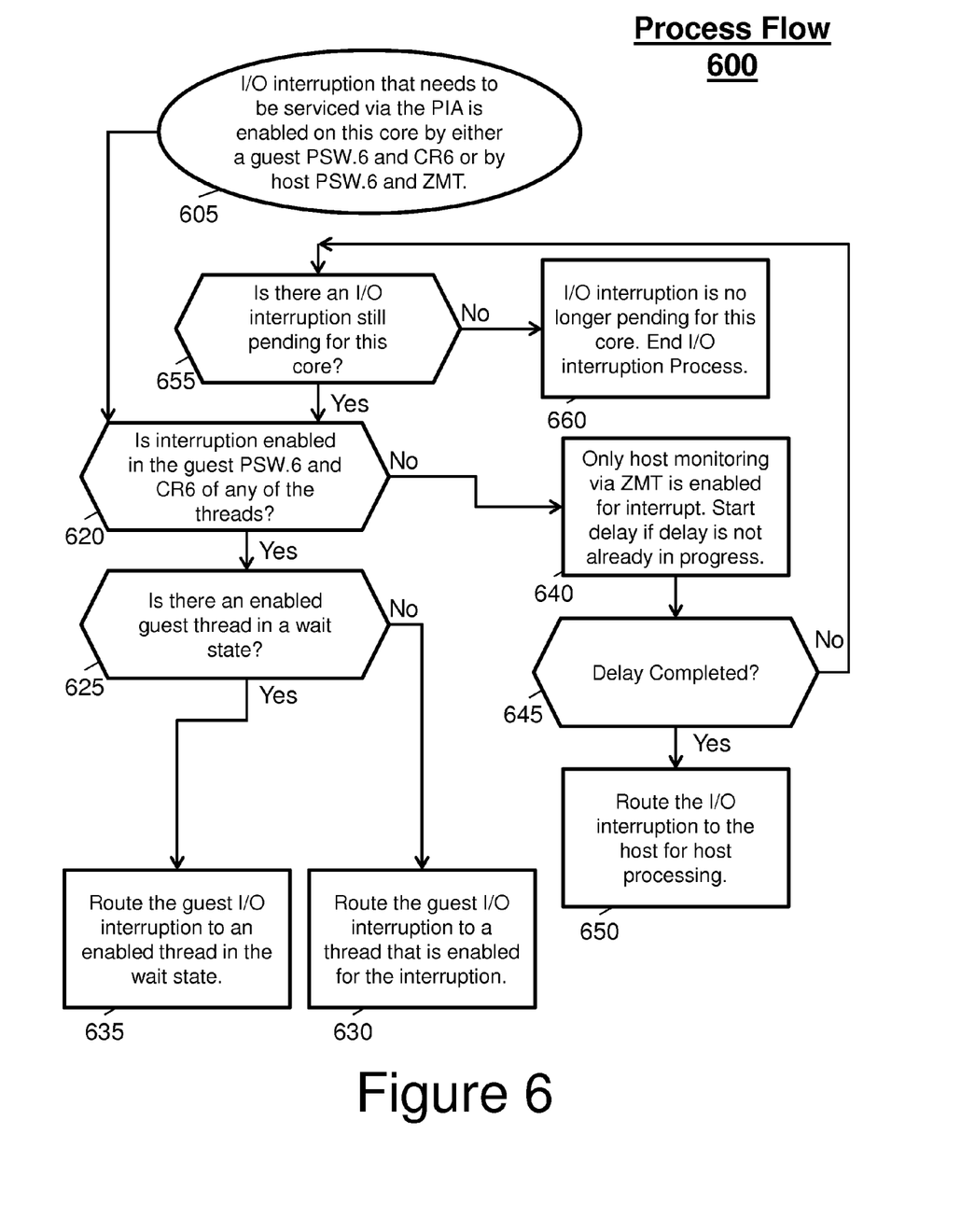

An embodiment of the modified priority routing by the multithreading system 100 will be described with reference to FIG. 6. FIG. 6 illustrates a process flow 600. Process flow 600 begins at start block 605 where an I/O interruption that needs to be serviced and is pending in the PIA is enabled on a core of the plurality of cores. I/O interruptions are enabled for a guest thread of the core via guest PSW.6 and an ISM in guest CR6. For host monitoring, I/O interruptions of all zones including zones not currently running on the core, are enabled through the host PSW.6 and the ZMT. Any pending I/O interruption for the current zone may be enabled in both the guest and the host at the same time.

At decision block 620, the process flow 600 makes a determination as to whether the guest control and status bits are enabled for the pending I/O interruption. For instance, the process flow 600 determines whether the pending I/O interruption is enabled in a guest PSW.6 and CR6 of any of guest threads of the core. If any guest thread is enabled, the process flow 600 proceeds to decision block 625 (e.g., as indicated by the 'Yes' arrow) where a determination is made as to whether any of a plurality of guest threads executing on the core and enabled for the interruption is in a wait state. If no guest threads are in the wait state and enabled for the I/O interruption, then the process flow 600 proceeds to block 630 (e.g., as indicated by the 'No' arrow) where the pending I/O interruption is routed to a guest thread for which the pending I/O interruption is enabled. If at least one of the plurality of guest threads is in the wait state and enabled for the pending I/O interruption, then the process flow proceeds to block 635 (e.g., as indicated by the 'Yes' arrow) where the pending I/O interruption is routed to a thread that is enabled for the interruption one of the plurality of guest threads in the wait state. The multithreading system 100 may utilize a routing algorithm that is random or otherwise for selection when determining the routing for multiple enabled threads in a wait state (635), or multiple enabled threads not in a wait state (630).

Returning to decision block 620, if the process flow 600 determines the pending I/O interruption does not have its corresponding guest PSW.6 and CR6 enabled for any of the plurality of threads of the core, then the process flow 600 proceeds to block 640 (e.g., as indicated by the 'No' arrow). At block 640, the process flow 600 had identified that only host monitoring is enabled for the pending I/O interruption and starts a delay before accepting the presentation of the pending I/O interruption to a host (if the delay is not already in progress). The delay may be hardcoded or programmable by the multithreading system, method, and/or computer program product. At block 645, the process flow 600 checks as to whether the delay has completed.

If the delay has not completed (e.g., as indicated by the 'No' arrow), then at decision block 655 (while delaying before accepting the interruption on this core) the process flow 600 makes a determination as to whether there is an I/O interruption pending. If there is no I/O interruption it will proceed to block 660 and end the hardware I/O interruption priority process (e.g., as indicated by the 'No' arrow). Further, at decision block 655, if an I/O interruption is still pending, then the process flow 600 proceeds back (e.g., as indicated by the 'Yes' arrow) to blocks 620 where the plurality of threads are checked for guest thread I/O interruption enablement before the delay is checked again. In turn, the delay allows one of the threads on the core, or a thread on another core, to enable and take the pending I/O interruption in the guest.

In general, as the process flow 600 loops through its iterations while delaying before accepting a host I/O interruption, the desired outcome will eventually be that no pending I/O interruptions are in the PIA because the original host interruption has been taken as a guest interruption by this or another core. If the delay has completed as determined by block 645, the process flow 600 proceeds to block 650 where the pending I/O interruption is routed to the host for host processing (e.g., as indicated by the 'Yes' arrow). Thus, only if the I/O interruption is still pending at the end of the delay will that I/O interruption be given to the host. In addition, in one embodiment, all enabled pending I/O interruptions will be taken at the end of the delay, and the delay will not start over until all enabled I/O interruptions have been processed.

Thus, in view of the above, the multithreading system 100 presents I/O interruptions to a guest thread in an enabled wait state, which is in the best state to handle an interruption (e.g., since it is not doing valuable work at the time), or failing that, to an enabled guest thread not in wait state. Further, by delaying the I/O interruptions that, on this core, are only enabled by a ZMT of a host, the multithreading system 100 allows time for some guest thread to enable for and take the interruption. In turn, a core does not need to leave emulation mode (e.g., disrupt all active threads on the core) and there is no unnecessary host processing done to find a core that is enabled for the I/O interruptions. Furthermore, the core will not be taken out of emulation mode, so that a guest enabled thread of the same configuration can be re-dispatched on the core to handle the I/O interruption.

In another example of the multithreading system 100 carrying out the operations and/or methodologies of the modified priority, when a logical core with multiple guest threads active is dispatched on a physical core, one or more of the threads may be in an enabled wait while one or more of the other threads are actively operating on the core. The active threads may be enabled for I/O interruptions via their PSW.6 and CR6 or disabled for I/O interruptions. In addition, a host could be monitoring for I/O interruptions via the Zone Mask Table for either this zone or some other zone. Thus, if only one thread is enabled for an I/O interruption that needs to be serviced, then the I/O interruption is routed to that thread. If there are multiple threads that are enabled for an I/O interruption that needs to be serviced, and at least one of the threads is in an enabled wait state, then the interruption logic of the multithreading system 100 biases the I/O interruption to one of the threads that is in an enabled wait state. By biasing the granting of the I/O interruption to a thread currently in an enabled wait state, the I/O interruption is handled more immediately on the thread that is not running anything useful and tends to avoid interrupting execution of an application on a thread that is currently in an active state.

In another example of the multithreading system 100 carrying out the operations and/or methodologies of the modified priority, if multiple guest threads are enabled for an I/O interruption that needs to be serviced, and none of them are in an enabled wait state, then the routing logic of multithreading system 100 may randomly or via an internal algorithm (e.g., such as round robin), choose a thread to receive the I/O interruption based on that thread's enablement. All other threads that may be enabled for a different I/O interruption based on other ISC bits are held off until the first thread completes its acceptance of the interruption. Once the first thread completes acceptance, then subsequent pending I/O interruptions are processed by any threads that are still enabled for any remaining I/O interruptions that need to be serviced. As indicated above, the routing of the I/O interruption may be biased to a thread that is now in the wait state, if one exists.

In another example of the multithreading system 100 carrying out the operations and/or methodologies of the modified priority, if there are no threads on a core that are enabled for an I/O interruption that needs to be serviced, yet a host is monitoring on the core for an interruption via the ZMT that is now pending in the PIA, the host will not immediately be granted the interruption for processing. Instead, there will be a delay in the granting of the interruption processing on the core, where the interruption remains pending in the PIA and is not immediately granted to the host to process. The delay allows either a thread on this core, or a thread on some other core, to enable for the I/O interruption and then process it. That is, only after the delay has completed and the I/O interruption is still in need of servicing, is the I/O interruption directed to the host to process.

In another example of the multithreading system 100 carrying out the operations and/or methodologies of the modified priority, if there are no guest threads on a core that are both in wait state and enabled for an I/O interruption that needs to be serviced, yet there is at least one guest thread not in wait state and enabled for the interruption, the enabled non-waiting thread will not immediately be granted the interruption for processing. Instead, there will be a delay in the granting of the interruption processing on the core, where the interruption remains pending in the PIA and is not immediately granted to the guest to process. The delay allows either a thread on this core, or a thread on some other core, to enter a wait state enabled for the I/O interruption and then process it. That is, only after the delay has completed and the I/O interruption is still in need of servicing, is the I/O interruption directed to the guest to process. In an embodiment, this delay is shorter than the delay described above for directing the interruption to the host. In this way, a three-level bias is introduced, favoring first a guest thread in wait state, then a guest thread not in wait state, and lastly the host as the least preferred choice.

In general, computing devices may include a processor (e.g., a processor 114 of FIG. 1) and a computer readable storage medium (e.g., a memory 116 of FIG. 1), where the processor receives computer readable program instructions, e.g., from the computer readable storage medium, and executes these instructions, thereby performing one or more processes, including one or more of the processes described herein.

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network and/or a wireless network, comprise copper transmission cables, optical transmission fibers, wireless transmission, routers, firewalls, switches, gateway computers and/or edge servers, and utilize a plurality of communication technologies, such as radio technologies, cellular technologies, etc.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, the multithreading system and method and/or elements thereof may be implemented as computer readable program instructions on one or more computing devices, stored on computer readable storage medium associated therewith. A computer program product may comprise such computer readable program instructions stored on computer readable storage medium for carrying and/or causing a processor to carry out the operations of multithreading system and method. The multithreading system and method and/or elements thereof, as implemented and/or claimed, improves the functioning of a computer and/or processor itself because the modified priority routing facilitates processing by threads in waiting, which improves processing resource efficiency and speed. That is, if the I/O interruption is enabled only at the host level on this core, the hardware delays the invocation of the I/O interruption firmware in hopes that another, guest-enabled thread on either another processor or on this processor will take the interruption first. This eliminates the overhead for the dequeue on the host-enabled thread but more importantly gives priority to the guest thread, whose overhead to handle the interruption is significantly less, in handling of the interruption. In turn the host is only ever interrupted to process any given I/O interruption when no enabled guest is running In addition, if any given core is enabled at both the guest and the host level, hardware will indicate to millicode that the interruption is a guest interruption. With the introduction of multi-threading, the hardware also has the ability, if two threads on any given core are both enabled for the interruption at the guest level, to present the interruption to a thread that currently running in wait state rather than to one that is not.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the Figures illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of implementing a modified priority routing of an input/output (I/O) interruption, comprising:
    determining, by a processor, whether the I/O interruption is pending for a core;
    determining, by the processor, whether any of a plurality of guest threads of the core is enabled for guest thread processing of the interruption in response to determining that the PO interruption is pending;
    determining, by the processor, whether at least one of the plurality of guest threads enabled for the guest thread processing is in a wait state,
    wherein each guest thread comprises an interrupt subclass mask that includes a control bit, a status bit, and a zone mask table,
    wherein the corresponding zone mask table comprises a plurality of enablement bits per supported zone,
    wherein the wait state for each guest thread is indicated by the status bit and the control bit associated with each guest thread,
    wherein the status and control bits are configured to enable the associated guest thread for the guest thread processing of the interruption;
    initiating a delay for routing the I/O interruption to a host based upon determining that none of the plurality of guest threads are enabled for the guest thread processing to prevent the core from leaving an emulation mode;
    based on determining that more than one of the plurality of guest threads enabled for the guest thread processing are in the wait state, selecting via a routing algorithm an enabled guest thread from the more than one of the plurality of guest threads enabled for the guest thread processing; and
    routing, by the processor, the I/O interruption to the enabled guest thread,
    wherein the I/O interruption is pending for a particular interrupt subclass within a particular zone of the core when the guest program-status word bit is on and an interrupt subclass is on in a corresponding zone mask table,
    wherein each of the plurality of enablement bits corresponds directly to the bits in a pending interrupt array of the core that is simultaneously enabled in both the enabled guest thread and the host.
2. The method of claim 1, wherein the I/O interruption is indicated as pending in a pending interrupt array.
3. The method of claim 1, further comprising:
    based upon determining that none of the plurality of guest threads enabled for the guest thread processing are in the wait state, routing the I/O interruption to one of the plurality of guest threads enabled for the guest thread processing.
4. The method of claim 1, further comprising:
    after the initiating of the delay, determining whether any of the plurality of guest threads of the core are enabled for the guest thread processing.
5. A system for implementing a modified priority routing of an input/output (I/O) interruption, comprising a processor and a memory:
    the processor being configured to:
        determine whether the I/O interruption is pending for a core;
        determine whether any of a plurality of guest threads of the core is enabled for guest thread processing of the interruption based upon determining that the I/O interruption is pending;
        determine whether at least one of the plurality of guest threads enabled for the guest thread processing is in a wait state,
        wherein each guest thread comprises an interrupt subclass mask that includes a control bit, a status bit, and a zone mask table,
        wherein the corresponding zone mask table comprises a plurality of enablement bits per supported zone,
        wherein the wait state for each guest thread is indicated by the status bit and the control bit associated with each guest thread,
        wherein the status and control bits are configured to enable the associated guest thread for the guest thread processing of the interruption;
        initiating a delay for routing the I/O interruption to a host based upon determining that none of the plurality of guest threads are enabled for the guest thread processing to prevent the core from leaving an emulation mode;
        based on determining that more than one of the plurality of guest threads enabled for the guest thread processing are in the wait state, selecting via a routing algorithm an enabled guest thread from the more than one of the plurality of guest threads enabled for the guest thread processing; and
        route the I/O interruption to the enabled guest thread,
        wherein the I/O interruption is pending for a particular interrupt subclass within a particular zone of the core when the guest program-status word bit is on and an interrupt subclass is on in a corresponding zone mask table,
        wherein each of the plurality of enablement bits corresponds directly to the bits in a pending interrupt array of the core that is simultaneously enabled in both the enabled guest thread and the host.
6. The system of claim 5, wherein the I/O interruption is indicated as pending in a pending interrupt array.
7. The processor of claim 5, further configured to:
    based upon determining that none of the plurality of guest threads enabled for guest thread processing are in the wait state, route the I/O interruption to one of the plurality of guest threads enabled for the guest thread processing.
8. The processor of claim 5, further configured to:
    after the initiation of the delay, determine whether any of the plurality of guest threads of the core are enabled for the guest thread processing.
9. A computer program product, the computer program product comprising a non-transitory computer readable storage medium having program instructions implementing a modified priority routing of an input/output (I/O) interruption embodied therewith, the program instructions executable by a processor to cause the processor to:
    determine whether the I/O interruption is pending for a core;
    determine whether any of a plurality of guest threads of the core is enabled for guest thread processing of the interruption based upon determining that the I/O interruption is pending;
    determine whether at least one of the plurality of guest threads enabled for the guest thread processing is in a wait state,
    wherein each guest thread comprises an interrupt subclass mask that includes a control bit, a status bit, and a zone mask table,
    wherein the corresponding zone mask table comprises a plurality of enablement bits per supported zone,
    wherein the wait state for each guest thread is indicated by the status bit and the control bit associated with each guest thread,
    wherein the status and control bits are configured to enable the associated guest thread for the guest thread processing of the interruption;
    initiating a delay for routing the I/O interruption to a host based upon determining that none of the plurality of guest threads are enabled for the guest thread processing to prevent the core from leaving an emulation mode;
    based on determining that more than one of the plurality of guest threads enabled for the guest thread processing are in the wait state, selecting via a routing algorithm an enabled guest thread from the more than one of the plurality of guest threads enabled for the guest thread processing; and
    route the I/O interruption to the enabled guest thread,
    wherein the I/O interruption is pending for a particular interrupt subclass within a particular zone of the core when the guest program-status word bit is on and an interrupt subclass is on in a corresponding zone mask table,
    wherein each of the plurality of enablement bits corresponds directly to the bits in a pending interrupt array of the core that is simultaneously enabled in both the enabled guest thread and the host.
10. The computer program product of claim 9, wherein the I/O interruption is indicated as pending in a pending interrupt array.
11. The computer program product of claim 9, wherein the program instructions are further executable by the processor to cause the processor to:
    based upon determining that none of the plurality of guest threads enabled for guest thread processing are in the wait state, route the I/O interruption to one of the plurality of guest threads enabled for the guest thread processing.

12. The computer program product of claim 9, wherein the program instructions are further executable by the processor to cause the processor to:
   initiate a delay for a routing of the I/O interruption to a host based upon determining that none of the plurality of guest threads are enabled for the guest thread processing.

13. The computer program product of claim 9, wherein the program instructions are further executable by the processor to cause the processor to:
   after the initiation of the delay, determine whether any of the plurality of guest threads of the core are enabled for the guest thread processing.

14. The system of claim 5, wherein the control bit comprises a guest control register, and the status bit comprises a guest program-status word bit.

* * * * *